(No Model.)
W. I. BUNKER.
WHEEL.
No. 477,502. Patented June 21, 1892.
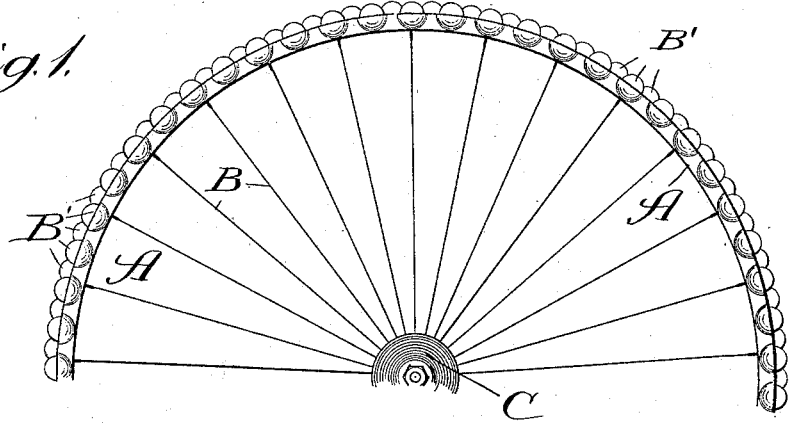
Fig. 1.
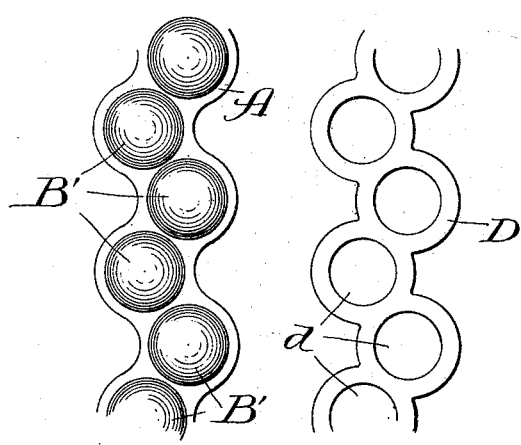
Fig. 2.
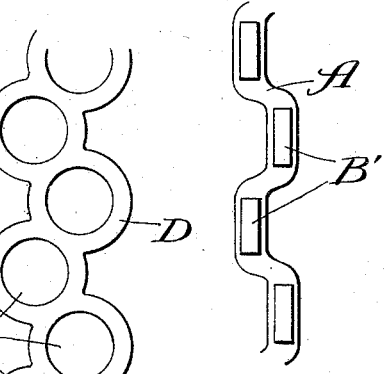
Fig. 3.
Fig. 4.
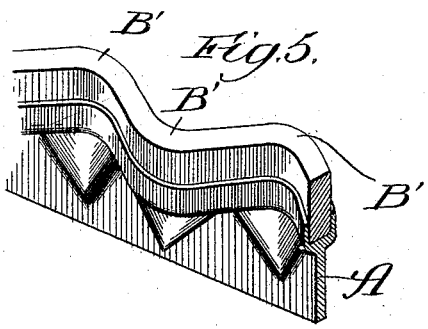
Fig. 5.
Witnesses:
Chas. E. Gaylord
Clifford N. White
Inventor:
William I. Bunker,
By Banning & Banning & Payson,
Attys

UNITED STATES PATENT OFFICE.

WILLIAM I. BUNKER, OF LA GRANGE, ILLINOIS.

WHEEL.

SPECIFICATION forming part of Letters Patent No. 477,502, dated June 21, 1892.

Application filed October 7, 1890. Serial No. 367,354. (No model.)

*To all whom it may concern:*

Be it known that I, WILLIAM I. BUNKER, a citizen of the United States, residing at La Grange, Illinois, have invented a new and useful Improvement in Wheels, of which the following is a specification.

My invention relates more particularly to the wheels of bicycles, baby-carriages, and similar light vehicles; and it consists in so forming the tires as to prevent the wheels from slipping sidewise when running over obstructions or out of a direct course; also, to form the bearing-surface so as to distribute the weight over more than one point of contact. Furthermore, my improved tire is possessed of great elasticity. To accomplish the above results, I employ elastic cushions or bearing-surfaces secured to the periphery and held to such periphery by any suitable means, and in the drawings I have illustrated several ways of attaching my improved tire to the periphery.

The particular point which I have desired to cover by this application is to construct a wheel in which the elastic cushions shall be arranged alternately on opposite sides of the center line of the rim, thereby securing additional steadiness and preventing liability of slipping, while not increasing the amount of surface in contact with the ground sufficiently to interfere in any manner with the efficient running of the wheel.

In the drawings, Figure 1 is a side elevation of a half of a wheel provided with my improved tire; Fig. 2, a plan view of a portion of the rim, illustrating the method of securing the elastic cushions thereto; Fig. 3, a similar view of one form of retaining-band that may be used, if desired; and Fig. 4 a plan view, and Fig. 5 a perspective view, illustrating modifications.

A is the rim; B, the spokes; C, the hub, and B' the elastic cushions forming the tire. In the first two figures the rim is made of an undulating form, as shown more particularly in Fig. 2, and is provided with depressions or sockets, into which are secured by cement or otherwise the balls of soft rubber or other material which form the cushions. These sockets may be made by providing the rim with a trough-shaped depression on its outer face, widening out at suitable points to afford a place for the accommodation of the cushions, or by making flat, rounded, or hemispherical depressions at the desired points of a size adapted to receive and hold the same. If desired, in addition to or instead of attaching these cushions by cement I may use an encircling band D, provided with openings $d$, arranged in undulating or alternating manner, as shown more particularly in Fig. 3, and adapted to encircle, engage with, and hold in place the cushions shown in the first two figures.

In Fig. 4 I have shown a modification wherein the same undulating or waving form is imparted to the rim of the wheel, but wherein the cushions, instead of being circular in cross-section, are rectangular, being cemented or otherwise secured in suitably-shaped recesses or depressions in the rim, the same principle of placing the cushions alternately on one side or the other of the center line of the rim being adhered to.

Lastly, in Fig. 5 I have shown an additional modification wherein the tire, though continuous, is made of elastic material and in a corrugated or wavy form, as shown, elastic cushions being formed at the external points of this form of tire, which has many, if not all, of the advantages of the preceding forms. It affords bearing-surfaces upon each side of the center line of the rim; but at the same time it brings into contact with the ground a greater amount of tire-surface, and is not therefore so useful a form as the others, nor does it embody quite as many advantages, although I consider it a highly useful and meritorious manner of constructing and embodying my invention.

While I have described more or less precise forms, I do not intend to limit myself thereto, but contemplate changes in form, proportions, and the substitution of equivalent members, as may be desirable or necessary, so long as the gist of my invention is not departed from, and it is evident that the shape or size of the elastic cushions might be altered in many ways, while still adhering to this principle.

I claim—

1. In a vehicle-wheel, the combination of a rim and an elastic tire secured thereto, such tire being formed into a series of cushions arranged alternately on opposite sides of the center line of the rim, substantially as described.

2. In a vehicle-wheel, the combination of a rim and a series of elastic cushions secured thereto, such cushions being arranged alternately upon opposite sides of the center line of the rim, substantially as described.

3. In a vehicle-wheel, the combination of a rim, a series of elastic cushions secured thereto on either side of the center line thereof, and a band surrounding the rim and arranged to engage with the cushions to retain them in place upon the rim, substantially as described.

WILLIAM I. BUNKER.

Witnesses:
GEORGE S. PAYSON,
THOMAS A. BANNING.